April 12, 1955  G. H. ROSTOCK  2,705,948
SOLAR WATER HEATER
Filed May 7, 1953  2 Sheets-Sheet 1
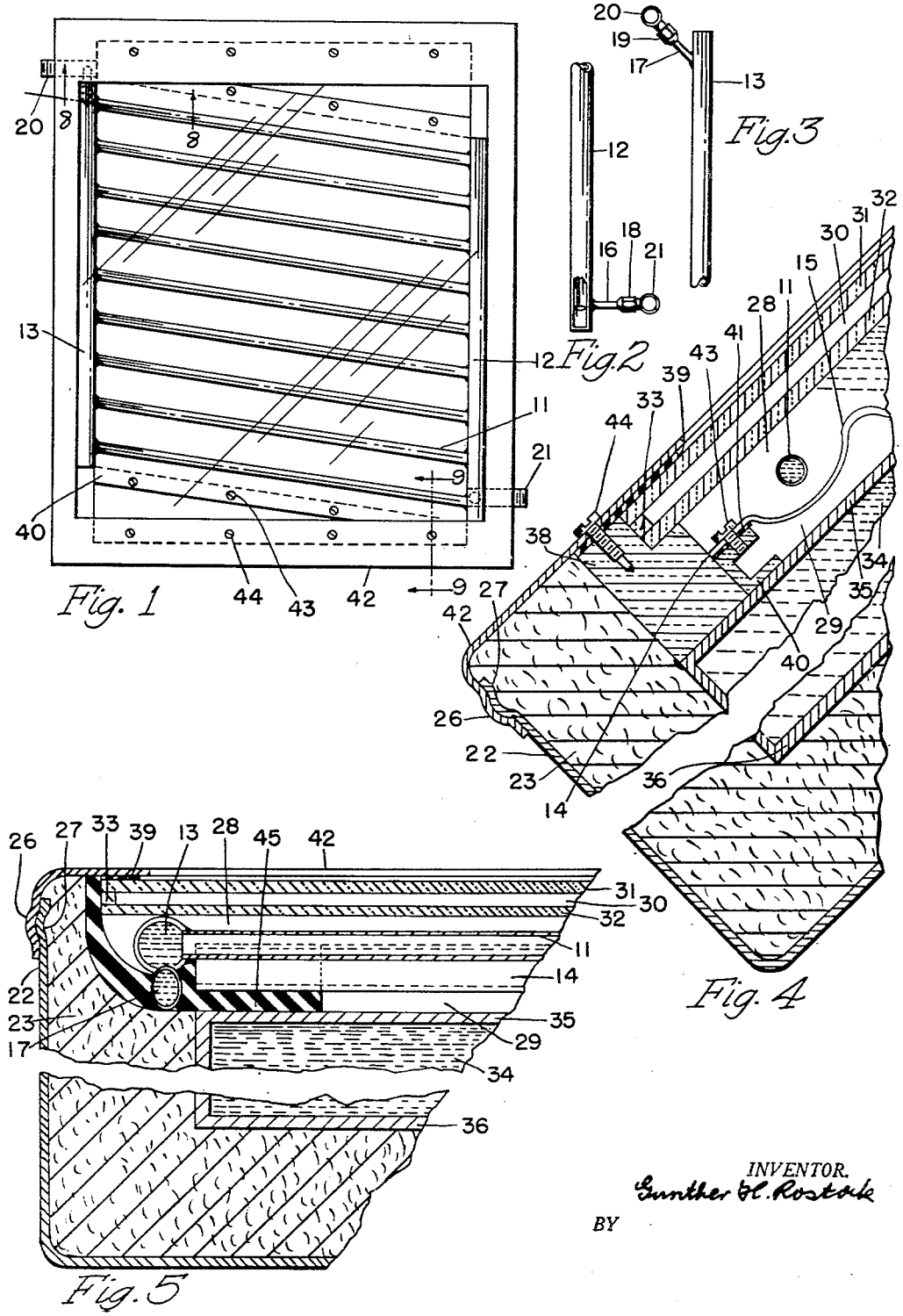
INVENTOR.
Gunther H. Rostock
BY April 12, 1955 G. H. ROSTOCK 2,705,948
SOLAR WATER HEATER Filed May 7, 1953 2 Sheets-Sheet 2

INVENTOR.
Gunther H. Rostock
BY

United States Patent Office 2,705,948
Patented Apr. 12, 1955

2,705,948

SOLAR WATER HEATER

Gunther H. Rostock, Huntington Park, Calif.

Application May 7, 1953, Serial No. 353,535

5 Claims. (Cl. 126—271)

The present invention relates to water heaters using the sun rays as source of energy.

Water heating systems of this character have heretofore been awkward to use, limited in their application, and complicated in design to counteract inherent defects.

One object of the present invention is to embody the essential components in one unit to eliminate complicated installation.

Another object of the invention is to embody the essential components in one unit to eliminate long pipe lines between the components in order to keep heat losses at a minimum.

It is also an object of the invention to absorb the heat rays of the sun during the time of sun exposure and prevent back radiation during the time of darkness.

The invention also provides a solar water heater which can be installed near the house at any time without disturbing the construction of the building.

Other objects and advantages of the invention will be apparent from the following description and claims, the novelty consisting of the features of construction, combination of parts, the unique relations of the members, and the relative proportioning, disposition, and operation thereof, all as more completely outlined herein and particularly pointed out in the appended claims.

In the drawings, which form part of the present specification:

Figure 1 is a front elevation of the water heater;

Figure 2 is a fragmentary view showing the cold water inlet connection;

Figure 3 is a fragmentary view showing the warm water outlet connection;

Figure 4 is an enlarged sectional view taken on 9—9 of Figure 1, with the heater in a tilted position;

Figure 5 is an enlarged sectional view taken on 8—8 of Figure 1;

Figure 6:
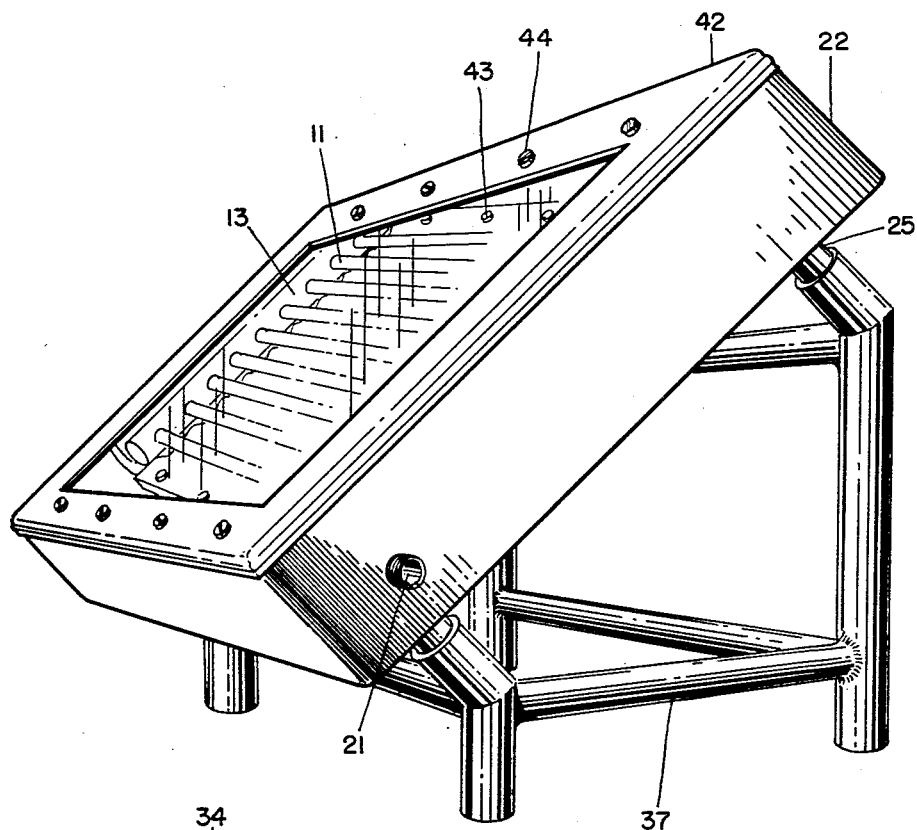
Figure 6 is a perspective view of the heater mounted on a stand.

Referring first to Figure 1, a plurality of inclined tubes 11 are connected to two larger tubes 12 and 13, so that the water entering near the bottom of tube 12 passes thru tubes or conduits 11 to tube 13. The tubes 11, 12 and 13 should be made, preferably, from a material of a low specific heat, like copper, and processed with a dark, dull color which has a good heat absorption; preferably the finish should be done by a process such as black oxide, to avoid insulation characteristics of a painted surface.

In Figure 2, tube 12 is closed at the top and bottom but has a tube connection 16 near the bottom, said tube 16 having a fitting 18, which is connected to a pipe 21. One end of pipe 21 is connected to a reservoir 34, Figures 4 and 5, and the other end of said pipe 21 is adapted to be connected to a cold water inlet line.

In Figure 3, tube 13 is closed at the top and bottom but has a tube connection 17 near the top, with a fitting 19, which is connected to a pipe 20. The tube connection 19 is inclined so that pipe 20 is higher than the top of tube 13, allowing the warm water to rise. One end of pipe 20 is connected to reservoir 34, Figures 4 and 5, the top of which is higher than the connection to pipe 20 to allow the warm water to rise further. The other end of pipe 20 comprises the warm water outlet.

Referring to Figures 4 and 5, the row of tubes 11 and the tubes 12 and 13 are exposed to the sun rays entering from the front window, which consists of two transparent glass or plastic panels 31 and 32, separated by a frame 33. The space 30 between panels 31 and 32 is marginally surrounded by frame 33 which forms a hermetic seal between said panels so that said space 30 is a dead air space which provides good heat insulator means. Radiation can only take place from the outside to the inside because the temperature of the heat source which is the sun is high enough to transmit the infrared rays thru the glass or plastic, but the temperature of the tubes never reaches the necessary degree to radiate thru a transparent body like glass or plastic.

The sun rays passing thru said panels also fall upon a corrugated sheet 14, which comprises a series of valleys forming substantially parabolic surfaces 15 connected by a radius. The sheet 14 can also be a sequence of radii connected by their tangents to each other. Whatever the true form of the individual corrugations are, the centerline or axis of the row of inclined tubes 11 should be at the focus relative to the respective corrugations. In other words, each tube or conduit extends along the focal line of its respective valley or substantially parabolic surface 15. The corrugated sheet 14 should have a good finished surface, and may be made from aluminum or the like, which has good reflection characteristics.

The sun rays entering thru the panels 31 and 32 fall upon the tubes 11 directly and are reflected by corrugated sheet 14 to the tubes 11 in the closed air space 28 between transparent panel 32 and sheet 14, the rays partially absorbed by the sheet 14 radiating some heat to the front side 35 of reservoir 34 thereby indirectly heating reservoir 34.

The corrugated sheet 14 is mounted top and bottom to the channel 40, which is welded or soldered to the front side 35 of reservoir 34, and heat insulating gasket 41 is placed between said channel 40 and sheet 14. A rubber strip 45 with contours matching the back of the corrugations of sheet 14 is placed left and right between sheet 14 and front side 35 of reservoir 34. Also, the tubes 12 and 13 bear against said strip 45 as well as against sides of the transparent members 31, 32 and 33. The screws 43 go thru the gasket 41 in the channel 40, holding sheet 14 and strip 45 in place, thereby providing a closed air space 29 between sheet 14 and front side 35 of reservoir 34, thereby eliminating heat exchange by conduction between sheet 14 and reservoir 34. The window consisting of panels 31 and 32 and frame 33 fits top and bottom in the insulating frame 38, which is cemented to the front side 35 of reservoir 34. The outer case or receptacle 22 holds the packing 23 between the frame 38, the strip 45, and the other sides of reservoir 34, in place. Packing 23 consists of fiber glass or other loose heat insulation material. The cover 42 is mounted, by means of the screws 44, to the frame 38, with an insulating gasket 39 between said frame 38 and cover 42. The raised portion 27 of case 22 fits in the depressed portion 26 of cover 42, holding same in place.

Figure 7:
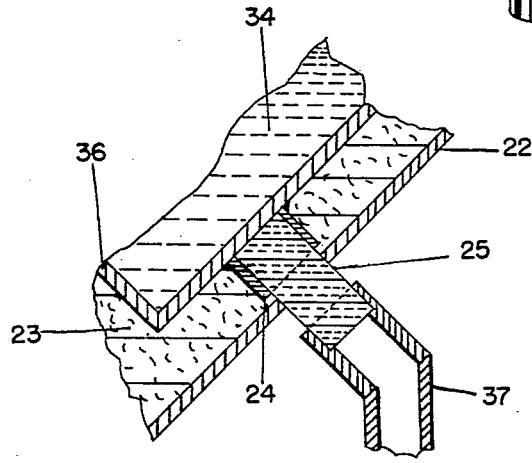
Figure 7 is a fragmentary sectional view showing the mounting member of heater and stand.

In Figure 7, the tubes 24 are shown as being welded to the back portion 36 of the reservoir 34. The stand 37, with plastic or wood rod 25 matching the inside of said tubes 24, is a separate structure.

The solar water heater can be mounted on or secured to this stand without a metal contact with any side of reservoir 34 or the outer case 22, since the tubes 24 are shorter than the distance between the back portion 36 of reservoir 34 and case 22.

The stand may be located on the south side of a house, with the window at an inclination of approximately 50 degrees relative to the horizontal so as to face the sun most of the time during the day.

It will now be apparent that while the solar heater is exposed to the sun the water in the inclined tubes 11 will rise on account of decrease of the specific gravity, with the water of the highest temperature at the top of tube 13 from which it passes into fitting 19, pipe 20 and thence to reservoir 34 wherein the water will rise further starting convection in reservoir 34. This water will be replaced by colder water from the bottom of the reservoir entering thru pipe 21, fitting 18, tube 16, and the tube 12. This water will be heated again and the circulation will continue as long as the sun rays are entering the window, thereby gradually heating all of the water in the reservoir.

By opening a faucet in the warm water line the cold water will push the warm water out of the reservoir. Naturally, the capacity of the reservoir should be in accordance with the warm water demand. However, it can easily be seen that a number of these solar heaters can be mounted in series by connecting the top pipe 20 of the first unit to the bottom pipe 21 of a second unit, the top pipe 20 of the second unit to the bottom pipe 21 of a third unit, and so on. Since the entering water in each unit has a higher temperature than that of the previous one, the total capacity of warm water can be multiplied by more than the number of heating units, when the water of all the units circulates thru a separate warm water storage reservoir.

The air in the spaces or chambers 28, 29 and 30 is dry air so as to reduce heat conduction therethru to a minimum.

It is to be understood, however, that a great number of variations may be made in the invention without departing from its spirit and scope. For example, the structure of the inclined tubes 11 mounted to the tubes 12 and 13 can be replaced by one continuous tube bent in such a manner that the straight portions of the tube fall into the same position as the inclined tubes 11.

It is believed the details of construction and manner and use of the solar water heater will be readily understood from the foregoing without further detailed explanation.

I claim:

1. A solar heating apparatus comprising a heat insulated casing, means forming a transparent window in one side of the casing for the admission of sun rays to the interior of the casing, conduit means mounted within the casing adjacent to the transparent window in the path of the sun rays passing through the window and adapted to absorb heat from the sun rays, a reflector mounted within the casing inwardly of said conduit means and adjacent to the transparent window and adapted to reflect the sun rays upon the inner side of the conduit means and also adapted to radiate heat inwardly within the casing, means forming a liquid reservoir within the casing inwardly of the reflector and close to the inner side of the reflector and connected with said conduit means so that liquid may circulate through the conduit means to and from the liquid reservoir, and means for supporting the casing with its transparent window facing the sun.

2. A solar heating apparatus comprising a heat insulated casing, a transparent window for a side of the casing adapted to admit sun rays to the interior of the casing, a plurality of conduits mounted within the casing rearwardly of the transparent window, common headers connected with corresponding ends of the conduits so that water may circulate through the conduits from one header to the other header, a corrugated reflector mounted within the casing rearwardly of the conduits and having its inwardly concave corrugations arranged rearwardly of the conduits for reflecting sun rays forwardly toward the rear sides of the conduits, a liquid receptacle mounted within the casing rearwardly of the corrugated reflector and adapted to absorb heat radiated by the reflector, and pipe means connecting said common headers and liquid receptacle, whereby liquid may circulate from the receptacle to one common header and from such header through the conduits to the other common header and back to the receptacle.

3. A solar heating unit comprising an insulated casing, a transparent window for the forward side of the casing adapted to admit sun rays to the interior of the casing, supporting means for the casing to hold the same inclined with the transparent window facing the sun, a plurality of conduits mounted within the casing rearwardly of the transparent window and being inclined toward the top of the inclined casing, common headers connected with corresponding ends of the inclined conduits so that water may rise through the conduits from one common header to the other header, a corrugated reflector mounted within the casing rearwardly of the conduits and near the conduits, the reflector having its forwardly opening corrugations arranged adjacent the rear sides of the conduits and extending longitudinally of the conduits with the conduits disposed substantially at the transverse centers of the corrugations, a water tank mounted within the casing rearwardly of the reflector and close to the reflector for absorbing heat radiated rearwardly by the reflector, a pipe connected with one of said headers near the lowermost conduit and also connected with the water tank, and a pipe connected with the other header near the uppermost conduit and also connected with the water tank, whereby water may circulate from the tank to one header and from such header through the conduits to the other header and then back to the tank.

4. A solar heating unit comprising an insulated casing, a transparent window for the forward side of the casing including a pair of spaced transparent plates having a first dead air space therebetween, a corrugated reflector mounted within the casing rearwardly of said window, means forming with said reflector and window a second dead air space between the reflector and window, a tank mounted within the casing rearwardly of the reflector and having a forward side arranged close to the reflector and substantially parallel therewith, means forming with the forward side of the tank and reflector a third dead air space between the forward side of the tank and reflector, conduit means including a plurality of spaced pipes disposed between the reflector and window with a forwardly opening corrugation of the reflector arranged adjacent to each pipe and extending longitudinally of the pipe, and pipe means connecting said conduit means and tank so that water may circulate through the conduit means to and from the tank while being heated.

5. A unitary solar heater comprising an insulated casing, a transparent window for the forward side of the casing to admit the sun's rays to the casing, means for supporting the casing in an inclined position with its transparent window facing the sun, a plurality of spaced substantially parallel pipes mounted within the casing rearwardly of said window, the pipes being inclined toward the upper end of the inclined casing, first and second headers connected with corresponding ends of the pipes with the second header arranged uppermost and adjacent the uppermost ends of the inclined pipes, a corrugated reflector mounted within the casing rearwardly of said pipes and having forwardly facing concave corrugations extending longitudinally of the pipes and centered with respect to the pipes, a generally flat tank mounted within the casing rearwardly of said reflector and close to the reflector for absorbing heat radiated by the reflector, a pipe leading from said tank and connected with the first header near its lowermost end, and a pipe leading from the tank and connected with the second header near its uppermost end, whereby water may rise from the first header, through said plurality of spaced pipes to the second header and then flow from the second header to the tank and from the tank back to the first header.

References Cited in the file of this patent

UNITED STATES PATENTS

| | | |
|---|---|---|
| 1,014,972 | Nichols | Jan. 16, 1912 |
| 1,250,260 | Wilcox | Dec. 18, 1917 |
| 1,258,405 | Harrison | Mar. 5, 1918 |
| 1,473,018 | Danner | Nov. 6, 1923 |
| 2,388,940 | Taylor | Nov. 13, 1945 |